United States Patent [19]

Casson et al.

[11] 4,299,869
[45] Nov. 10, 1981

[54] PROTECTION OF SUBSTRATES AGAINST CORROSION

[75] Inventors: Harold V. Casson, Kingston; Grant G. Crabtree, Napanee; Bruno Kindl; Edward B. Noonan, both of Kingston, all of Canada

[73] Assignee: Huron Chemicals Limited, Ontario, Canada

[21] Appl. No.: 27,436

[22] Filed: Apr. 5, 1979

Related U.S. Application Data

[60] Continuation-in-part of Ser. No. 827,411, Aug. 24, 1977, abandoned, which is a division of Ser. No. 748,437, Dec. 8, 1976, abandoned.

[51] Int. Cl.³ .................. B65D 25/14; B32B 15/14; B32B 17/06
[52] U.S. Cl. ........................ 428/35; 156/87; 220/412; 220/460; 426/131; 204/275; 428/36; 428/138; 428/304; 428/317; 428/421; 428/422; 428/447; 428/266; 428/268
[58] Field of Search ............... 428/138, 447, 266, 268, 428/317, 304, 422, 421, 36, 35; 204/275, 278, 95; 220/366, 373, 412, 460; 156/87, 310, 315, 307.3, 307.7; 426/131

[56] References Cited

U.S. PATENT DOCUMENTS

| | | | |
|---|---|---|---|
| 2,567,804 | 9/1951 | Davies | 428/447 |
| 2,591,383 | 4/1952 | Spalding | 428/447 |
| 2,697,054 | 12/1954 | Dietz . | |
| 2,751,314 | 6/1956 | Keil | 428/447 |
| 2,860,083 | 11/1958 | Nitzsche | 428/447 |
| 2,907,677 | 10/1959 | Hochberg | 428/268 |
| 2,955,974 | 10/1960 | Allen | 428/268 |
| 3,025,185 | 3/1962 | Schmidt | 428/268 |
| 3,175,921 | 3/1965 | Hedlund . | |
| 3,262,810 | 7/1966 | Campbell | 428/266 |
| 3,434,869 | 3/1969 | Davidson . | |
| 3,519,516 | 7/1970 | Zhinkin . | |
| 3,560,244 | 2/1971 | Neuroth . | |
| 3,619,255 | 11/1971 | Lengnick | 428/447 |
| 3,620,895 | 11/1971 | Bailey . | |
| 3,634,136 | 1/1972 | French . | |
| 3,686,731 | 8/1972 | Koori | 428/447 |
| 3,701,753 | 10/1972 | Shaw . | |
| 3,702,778 | 11/1972 | Mueller | 428/447 |
| 3,714,290 | 1/1973 | Kehr . | |
| 3,717,617 | 2/1973 | Marrs . | |
| 3,720,699 | 3/1973 | Stoddard | 528/10 |
| 3,759,742 | 9/1973 | Salamon | 428/266 |
| 3,772,122 | 11/1973 | Young . | |
| 3,783,091 | 1/1974 | Leslie . | |
| 3,799,838 | 3/1974 | Shaw . | |
| 3,911,998 | 10/1975 | Domicone | 428/447 |
| 3,922,186 | 11/1975 | Segawa | 428/268 |
| 3,928,683 | 12/1975 | Chandress | 428/447 |
| 3,928,684 | 12/1975 | Buning . | |
| 3,930,090 | 12/1975 | Campbell | 428/447 |
| 3,935,348 | 1/1976 | Smith | 428/447 |
| 3,968,297 | 7/1976 | Sauer | 428/268 |
| 3,985,154 | 7/1976 | Kapral | 428/447 |
| 3,993,827 | 11/1976 | Dukert | 428/268 |
| 4,002,800 | 1/1977 | Nestler | 428/447 |
| 4,025,693 | 5/1977 | Milne | 428/447 |
| 4,029,836 | 6/1977 | Wieczorek | 428/266 |
| 4,034,140 | 7/1977 | Przybyla | 428/447 |
| 4,059,473 | 11/1977 | Okami | 428/447 |
| 4,102,721 | 7/1978 | Carey | 428/317 |

FOREIGN PATENT DOCUMENTS

846806 7/1970 Canada .
954640 9/1974 Canada .

OTHER PUBLICATIONS

Chem. Abst., vol. 27, 63541n (1972).

Primary Examiner—Ellis P. Robinson
Attorney, Agent, or Firm—Beveridge, DeGrandi & Kline

[57] ABSTRACT

Substrates which are susceptible to corrosion by the action of chemical agents in gas-containing and/or gas-generating media are rendered resistant to said corrosion by the application thereto of a coating of a gas-permeable elastomeric or plastic material, and providing for means of escape of gases permeating the coating, thereby maintaining the adhesion of the coating to the substrate. Preferably the coating is applied first to a porous backing material such as woven glass cloth, so that the pores of the backing material are left substantially open to let gas escape. The laminate of coating and porous backing material is then adhesively secured to the substrate in such a way that the pores in the backing material are left partly open to let gas escape. The invention has particular application to the lining of electrolytic cells, cell tanks, submerged buswork, and associated equipment (except electrodes); and also to the lining of chemical process vessels, equipment, piping, valves and the like for use in the production and handling of chemicals.

15 Claims, 3 Drawing Figures

PROTECTION OF SUBSTRATES AGAINST CORROSION

REFERENCE TO RELATED APPLICATIONS

This application is a continuation-in-part of our co-pending application Ser. No. 827,411 filed Aug. 24, 1977, now abandoned, which in turn is a divisional application of co-pending application Ser. No. 748,437 filed Dec. 8, 1976, and now abandoned, the entire disclosures of which are relied on and incorporated herein by reference.

The present invention relates generally to the provision of improved corrosion resistance for chemical process equipment and apparatus.

More particularly, the present invention relates to the provision of linings and coatings using any gas-permeable sheet or spreadable plastic or coating material such as catalyst cured or room temperature cured thermoplastic material, for example, silicones, as materials of construction, for equipment, storage tanks, valves, fittings, piping and the like, for producing and handling corrosive chemicals and food products in liquid, mixed phase or gaseous form and by-products thereof, which products and by-products have a pH within the corrosion resistant range of the lining material; for example, in the range of 9 or less for silicones, and which contain dissolved or entrained oxygen, air or gases of similar molecular weight.

The present invention particularly relates to the provision of enhanced corrosion resistance for electrolytic cells, cell tanks and cell containers, submerged buswork and other parts, in process and storage tanks and piping, valves and fittings to handle the product and by-products of production processes for the electrolysis of alkali metal halide brines; and to the provision of lining and coating materials for containers and internal equipment, except electrodes, for electrolytic cells for the production of sodium chlorate, and those for the production of caustic soda and chlorine in which hydrogen, oxygen and chlorine are present.

The present invention also relates to the provision of coatings and linings for enhanced corrosion resistance of metal parts and internals of containers such as electrolytic cells which are electrically cathodic to the contents and which through migration of conductive liquid through or other leakage back of such linings or coatings permit the generation of hydrogen or other gas at the metal surface, which if not permitted to escape will bubble the lining or coating off the metal part.

The requirements for the materials of construction for coatings and linings for the above services are:

(a) resistance to corrosion in wet chlorine, hydrogen chloride, hypochlorous gases and vapours, and aerosols and in low concentration hypochlorite solutions having a pH within the corrosion resistance range of the coating material;

(b) stability and absence of cracking and embrittling and of sagging in the environments above-outlined at temperatures of up to 100° C.;

(c) high dielectric strength and retention of this dielectric strength under service conditions;

(d) easily repairable in service;

(e) with enough elasticity to withstand temperature changes and differential temperature coefficients of expansion for the various materials of construction and substrates of the equipment, and to be able to withstand thermal shock;

(f) if it is to be used for electric current conducting buswork protection, then it must have adequate thermal conductivity; and (g) stability of the protective chemical-resistant coating or lining bond to the structural substrates under temperature, mechanical distortion and other conditions arising from the operating parameters of the system.

Materials commonly used for the above services have been combinations of ceramic materials with a polyurethane foam membrane, cathodically-protected steel, and plasticized and unplasticized PVC (polyvinyl chloride) or fiberglass reinforced polyester (FRP) resin lined with unplasticized PVC sheet. All of these materials have certain disadvantages, particularly at higher temperatures. The ceramic with polyurethane foam membrane degrades over a period of a few years and requires extensive and difficult repair. PVC and particularly PVC-lined FRP (fiberglass reinforced polyester) is limited in temperature application to about 50° C., and above this temperature it tends to craze and embrittle. At a surface temperature of about 60° to 65° C. it corrodes away in a sodium chlorate cell environment at a rate of 160 mils per year. In addition, at these higher temperatures as a result of thermal expansion it distorts and cracks relative to the supporting structures of FRP.

Cathodically-protected steel has a disadvantage in that it requires expensive electrical supply and monitoring equipment and has a continual operating cost for electric power.

Certain other materials do meet some of the above requirements, however. These are of the class of fluorocarbon resins such as those derived from vinylidene fluoride and polyvinylidene fluoride and tetrafluoroethylene, etc., generally the group of polymers known generically as fluorocarbon resins. Typical materials of this nature are those known and sold under the trademarks "Kynar"*, "Teflon" and "Kel-F"*. These are, however, very costly for application as process vessel and electrolytic cell liners for lining fiberglass reinforced plastic vessels or metal vessels. The costs are of the order of $10–$30 per sq. ft. plus the costs of time-consuming fabrication and application of these liners to supporting substrates. In addition, for example, in impregnated glass cloth laminate forms these fluorocarbon resins show attack by bleaching in brine electrolysis tanks, within a few weeks.

*—Trademark of Pennwalt Chemicals Corp. for polymers of vinylidene fluoride.
**—Trademark of duPont for polytetrafluoroethylene.
***—Trademark of 3-M Co. for poly (trifluorochloroethylene).

In view of the above-mentioned disadvantages of the materials used to date for lining chemical process vessels and equipment, and in particular, for lining electrolytic cells, tanks and accessory equipment, there has been a continuing search for improved materials for this purpose. Desirably, the lining materials should meet all or at least most of requirements (a)-(g) previously listed, but should be more economical to use than fluorocarbon resins as typified by "Kynar", "Teflon" or "Kel-F". The present invention as hereinafter described is directed towards the provision of such improved lining materials.

An objective of the present invention is the provision of a method of providing effective corrosion resistance to substrates susceptible to corrosion by chemical agents in gas-containing or gas-generating media such as are present in electrolytic cells and vessels.

Another objective of this invention is to provide lining materials for chemical process vessels and equipment, and in particular, for the lining of electrolytic cells, vessels and accessory equipment which provide effective corrosion resistance to substrates but are economical from the standpoint of material costs, installation and maintenance.

A further objective of the present invention is to provide an effective way of utilizing more economical lining materials for chemical process vessels and equipment than those lining materials heretofore used, while at the same time providing effective corrosion resistance to substrates susceptible to corrosion by a corrosive and/or gas-containing and/or gas-generating medium.

Still another objective of the invention is to provide a commercially feasible way of applying a gas-permeable elastomeric and/or plastic material such as for example an RTV silicone coating to a corrosion-susceptible substrate, by applying the coating first to a porous backing material, and then adhesively securing the laminate of coating and porous backing material to the supporting substrate.

Another objective of the present invention resides in a method of applying an elastomer to a substrate so that corrosion protection is obtained while gases permeating through the elastomer lining are permitted to bleed to the atmosphere. All materials have gas permeability to various degrees.

Elastomers have high permeabilities, e.g., up to $10^{-1}$ ml/hr cm$^1$ cm atm. 20° C. Table I which follows shows various materials and allows some comparisons to be made.

It has been futhermore found that silicone and fluorosilicone and fluorocarbon elastomers can be used as lining materials for the purposes previously mentioned, and that these silicone and fluorosilicone and fluorocarbon materials provide very effective corrosion resistance to substrates which are susceptible to corrosion by a corrosive chemical containing and/or gas containing or gas-generating medium.

The silicone elastomers are RTV (Room Temperature Vulcanizing) silicones, heat curing silicones, and fluorosilicones.

These RTV silicone rubbers, which are fractional distillation products of dimethyl silicone and which can be cured either by hydrolysis or by use of a catalyst, and which are made commercially available in North America by the General Electric Company and its Canadian subsidiary, the Dow-Corning Company and its Canadian subsidiary and by SWS Silicone Corporation and by other companies, are offered in various distillation range products which differ in molecular weight, and curing and bonding characteristics. They are to various degrees thixotropic and have varying densities. These products are generally of various categories such as described below:

1. RTV silicone rubber of the category of one component room temperature vulcanizing (RTV) polysiloxane adhesive sealants utilizing an acetoxy cure system and containing silica fillers in conjunction with acyloxy silane. The siloxane most commonly used is dimethyl polysiloxane, and cure is achieved by entrance of water vapour from the air to the system.

2. RTV silicone rubber made with tin-catalyzed condensation cure systems in which the base material is a silicone polymer, commonly dimethyl polysiloxane, and a silicone cross-linker to which filler materials are added to achieve the final required physical properties. The curing catalysts may be stannous octoate or dibutyl tin dilaurate.

3. The heat curing silicone rubbers can be described as products similar to the RTV rubbers mentioned above. They differ in their curing procedures in that the heat curing rubbers require catalysts such as benzoyl peroxides and temperatures in the range of 300°-450° F., and quite often they also require the simultaneous application of pressure to form the cured material.

4. The fluorosilicone rubbers on the market are also commonly cured by the application of heat at 300° F. or higher and pressure. Catalysts are also often needed.

5. Some fluorosilicone elastomers presently on the market are room temperature curing elastomers.

TABLE I

| Supplier | Materials | Permeability to $O_2$ mls $O_2/cm^2$/cm thick/hour at 1 atm at the specified temperature | |
|---|---|---|---|
| Union Carbide Corporation | Polysulfone | $3.77 \times 10^{-5}$ | @ 25° C. |
| Norton | "Tygon" (Trademark for a vinyl chloride-vinyl acetate copolymer resin) | $4.92 \times 10^{-6} - 3.28 \times 10^{-4}$ | @ 25° C. |
| Various Suppliers | H.D.P.E.* | $3.03 \times 10^{-5}$ | @ 25° C. |
| Various Suppliers | M.D.P.E.* | $3.03 \times 10^{-5} - 8.78 \times 10^{-5}$ | @ 25° C. |
| Various Suppliers | L.D.P.E.* | $8.2 \times 10^{-5}$ | @ 25° C. |
| DuPont & Co. Inc. | E.T.F.E. (TEFZEL)[1] | $1.64 \times 10^{-5}$ | @ 25° C. |
| Various Suppliers | Polyester (PE Terephthalate) | $4.92 \times 10^{-7} - 6.56 \times 10^{-7}$ | @ 25° C. |
| Various Suppliers | PVC | $8.2 \times 10^{-7} - 4.9 \times 10^{-6}$ | @ 25° C. |
| Dynamit Nobel | PVDF | $3.14 \times 10^{-4}$ | @ 20° C. |
| Various Suppliers | Polypropylene | $2.43 \times 10^{-5}$ | @ 20° C. |
| DuPont & Co. Inc. | "Viton" (trademark for a fluoroelastomer based on vinylidene fluoridehexafluoropropylene copolymers) | $3.96 \times 10^{-5}$ | @ 30° C. |

TABLE I-continued

| Supplier | Materials | Permeability to $O_2$ mls $O_2/cm^2$/cm thick/hour at 1 atm at the specified temperature | |
|---|---|---|---|
| DuPont & Co. Inc. | "Viton" E Series | $6.02 \times 10^{-6}$ | @ 20° C. |
| DuPont & Co. Inc. | Neoprene | $8.44 \times 10^{-5}$ | @ 25° C. |
| DuPont & Co. Inc. | "Teflon" (FEP) | $1.21 \times 10^{-4}$ | @ 25° C. |
| DuPont & Co. Inc. | "Kalrez" (trademark) | $1.31 \times 10^{-6}$ | @ 20° C. |
| Various Suppliers | Dimethyl Silicones | $1.37 \times 10^{-2}$ | @ 25° C. |
| Various Suppliers | 100% Silicone (Dimethyl) | $1.58 \times 10^{-2}$ | @ 20° C. |
| Dow Corning | Extreme Low Temp Silicone | $1.2 \times 10^{-2}$ | @ 20° C. |
| Dow Corning | 100% Fluorosilicone (heat cure) | $2.93 \times 10^{-2}$ | @ 20° C. |
| Various Suppliers | Natural Rubber | $4.68 \times 10^{-4}$ | @ 20° C. |
| Various Suppliers | Butyl Rubber | $3.53 \times 10^{-5}$ | @ 20° C. |
| DuPont & Co. Inc. | Urethane Rubber | $2.88 \times 10^{-5}$ | @ 20° C. |
| Various Suppliers | Iron | $4 \times 10^{-14}$ (nitrogen)$^o$ | @ 25° C. |
| Various Suppliers | Steel | $4 \times 10^{-6}$ (hydrogen)$^x$ | @ 25° C. |
| Various Suppliers | Palladium | $4 \times 10^{-4}$ (hydrogen)$^x$ | @ 25° C. |

$^o$Permeability for $O_2$ is also extremely small
$^x$Permeability for $H_2$ reported for comparison
$^1$Trademark
*High, Medium, Low Density Polyethylene The materials shown in Table I can be organized in three groups:

TABLE II

| | Permeability at RT for $O_2$ |
|---|---|
| Silicones and Fluorosilicones | $10^{-2}$ ml/cm$^2$ cm hr atm |
| Fluorocarbon | $10^{-3}$ to $^{-4}$ |
| Plasticised PVC | |
| PE | |
| "Teflon" | |
| Rubbers | |
| "Viton" | |
| Neoprene | $10^{-5}$ ml/cm$^2$ cm hr atm |
| PVC (unplast) | |
| Polyester | $10^{-7}$ ml/cm$^2$ cm hr atm |
| (Metals) Iron | $10^{-14}$ ml/cm$^2$ cm hr atm |

It is obvious the silicones and fluorosilicones and fluorocarbons are from one hundred to several thousand times more permeable to gases such as $O_2$ than are hard plastics such as PVC or polyester, or than are metals.

It is also to be noted that the permeability of the materials increases as their temperature increases. As an example the $O_2$ permeability of dimethylsilicones increases by approximately 15% every 20° F. of temperature increase according to General Electric Co data. It is obvious that the problems related to the permeation of gases through the membranes will therefore increase as the temperature increases.

Tables I and II show that lining materials composed of silicones or fluorosilicones or fluorocarbons, i.e. materials that have been proven to resist corrosion by halogen containing fluids, will let gases permeate through at very large rates when used as liners for gas generating or gas containing liquids.

It is therefore obvious that when any of the high permeability materials of Table II such as silicones, fluorosilicones or fluorocarbons, are used as linings to protect s metal or hard plastic container any gases dissolved in the liquor held in the container will tend to permeate the lining. The permeating gases will collect between the lining and the metal or polyester or PVC tank wall and bubbles will develop unless a bleed path is offered.

It is a major objective of the present invention to describe a method to have a bleed path behind the permeable linings so that the gas bubbles will not form and cause the detachment and collapse of the lining.

It is commonly known in the art in respect to materials of construction of equipment for the electrolysis of alkali metal halides, that silicones commonly offered as silicone sealants can be used for non-rigid parts and for repair of rigid parts such as those made of PVC; but these materials, although resistant to corrosion by the chemicals involved, do not adhere to the surfaces to which they are applied and can only be held in place by some form of mechanical keying or locking. This is as expected, and in general the literature indicates that they are characterized by the quality of non-sticking to adjacent parts or materials (See *Plastics Encyclopaedia* 1972 edition, Vol. 49, No. 10A, page 112 and U.S. Pat. No. 3,620,895 of Bailey et al., issued Nov. 16, 1971.).

The use of silicone elastomers as coating materials for various types of substrates and for a variety of purposes is well known, and is described in, for example, U.S. Pat. No. 2,567,804 of Davies, issued Sept. 11, 1951; U.S. Pat. No. 2,591,383 of Spalding, issued Apr. 1, 1952; U.S. Pat. No. 2,751,314 of Keil, issued June 19, 1956; U.S. Pat. No. 2,860,083 of Nitzsche et al., issued Nov. 11, 1958; U.S. Pat. No. 3,686,731 of Koori et al., issued Aug. 29, 1972; U.S. Pat. No. 3,701,753 of Shaw, issued Oct. 31, 1972; U.S. Pat. No. 3,720,699 of Stoddard, issued Mar. 13, 1973, and U.S. Pat. No. 3,930,090 of Campbell et al., issued Dec. 31, 1975. However, the above-mentioned prior art does not disclose that silicone resins would be effective as lining materials for electrolytic cells or for chemical process equipment where such equipment would normally be exposed to corrosive environments, for instance, liquids containing dissolved or entrained gases or to gases entraining corrosive liquids.

The present invention, in one broad aspect, resides in an improvement in a method of imparting improved corrosion resistance to a substrate wherein the substrate is coated with a gas-permeable elastomeric material which is resistant to the action of chemicals, which improvement comprises providing means for escape of gases permeating the coating, from between said coating and the supporting substrate, said means for escape of gases serving to prevent a buildup of said gases between said coating and said substrate which would tend to dislodge the coating from the substrate, and thereby maintaining the adhesion of the coating to the substrate.

In one broad aspect the invention resides in the discovery that elastomers before curing do not penetrate completely in between the fibers of mats or the pores of porous materials. A practical commercial way of obtaining a porous backing for an elastomer is therefore described.

The present invention, in its broadest aspect, is considered to lie in a procedure for utilizing elastomeric materials which are resistant to chemical liquors, but permeable by gases as protective coatings and linings to structural substrates or electrical conductor elements.

All plastics and linings are gas permeable to a degree and most processes evolve or involve some entrained or dissolved gases as already shown in Table I. All linings commonly applied appear subject to gas bubbling off the substrates, particularly in electrolytic cell containers and electro-plating tanks where tanks and vessels may be cathodic and release hydrogen. Efforts to date to make linings work have been directed to complete saturation of the back of the lining materials, applied to the substrates, and using more and stronger adhesives such as epoxies. This invention in its broadest aspect is to provide for escape of the permeating gas, without pressure build-up behind the lining.

This invention, in another aspect, resides in a method of imparting to a substrate improved resistance to corrosion thereof by a corrosive or gas-containing or gas-generating medium, said method comprising: applying an RTV silicone rubber coating to a porous backing material, adhesively securing said backing material to said substrate, and providing means for escape of gases permeating said coating, from between said coating and the supporting substrate, said means for escape of gases serving to prevent a buildup of gases between said coating and said substrate which would tend to dislodge the coating from the substrate, whereby the adhesion of said coating to said substrate is maintained.

The present invention, in this aspect, really resides in applying the coating first to porous backing material. Application has to be done in such a way as to leave the pores of the backing material substantially open-that is, in contact with the outside atmosphere-so that the coating applied penetrates into the porous backing material in such a controlled way that the backing material is held mechanically by the coating and yet its porous body is substantially free from coating material. The application of the coating is done in such a way that the elastomeric material will fill 3-30% of the pores of the backing material. The filling is controlled by the fact that the elastomeric material are quite viscous (e.g. 100-2000 poise) and a limited mechanical work and heating if necessary and their own capillarity will put them in good contact with the porous backing material, but at the same time it will limit the fraction of pores filled.

Any plastic materials, therefore, can be used for our application if they resist corrosion and if they have a suitable viscosity during mounting on a porous backing. Practical means to apply the coating to the porous backing are spraying, trowelling, extruding, compressing etc.

The controlled application of the coating to the porous backing therefore allows from 70% to 97% of the pores to remain open.

A laminate is therefore obtained that is constituted by an elastomeric layer that coats a porous backing.

The laminate can be mounted on a substrate to protect such substrate from corrosion.

Mounting of the laminate can be obtained in various ways with suitable adhesives, cements and/or resins.

It is most important that also the laminate mounting operation be done in a controlled way. The controlled mounting should be done so that a substantial number of the open pores of the porous backing of the laminate remain open to the atmosphere.

The mounting procedure is done so that the adhesive, cement, or resin compound flows into only part of the open pores of the porous backing of the laminate. The limited filling is achieved by a limited mechanical work and the use of the above adhesive, cement or resin compound which has a viscosity in the range of 1–200 poise and is only slightly less viscous then the elastomeric polymer itself.

The mounting procedure must be done so that 10 to 50% of the open pores of the porous backing of the laminate open to the atmosphere.

It is obvious that by controlling the fraction of pores that remain open to the atmosphere after the laminate fabrication and the mounting operation a lining is obtained that offers a gas bleed path within its structure.

The gas bleed path is a major feature of the present invention and it can be described also by saying that a suitable combination of known materials when assembled in the mode here described allows elastomers to be used as corrosion protective linings also in presence of corrosive liquids that contain gases that permeate through the linings.

A second feature of the present invention resides in the discovery that silicone rubbers and fluorosilicone rubbers are elastomers that can be used as linings in electrolytic cells for chlorine and chlorate production and as linings for vessels to hold the products, by-products and co-products of such cells.

More particularly, the present invention resides in a method of imparting to a substrate improved resistance to corrosion thereof by a corrosive chemical and gas-generating medium, which method comprises:

(1) applying to said substrate an elastomeric coating having a permeability of at least $10^{-4}$ ml./cm$^2$. hr. atm. at room temperature for oxygen, selected from the following categories:
(a) RTV (room temperature vulcanizing) polysiloxane adhesive sealants utilizing an acetoxy cure system, and incorporating a filler and an acyloxy silane;
(b) RTV silicone rubber made with a tin-catalyzed condensation cure system, said silicone rubber comprising a silicone polymer, a cross-linking agent and a filler material;
(c) composite silicone base materials comprising dimethyl siloxane copolymers and styrene acrylic esters; and
(d) fluorocarbon elastomers;

(2) adhesively securing said elastomeric coating to said substrate; and (3) providing means for escape of gases permeating said coating, from between said coating and the supporting substrate, said means for escape of gases serving to prevent a build up of gases between said coating and said substrate which would tend to dislodge the coating from the substrate, whereby the adhesion of said coating to said substrate is maintained.

Preferably, the silicone rubber coating is first applied to a porous backing material, and then said backing material (such as for example woven glass cloth) is adhesively secured to the substrate.

In still another aspect the present invention resides in a corrosion-protective system which comprises:

(1) a substrate which is susceptible to corrosion by the action of a corrosive chemical-containing and gas generating medium, (2) an elastomeric coating having a permeability of at least $10^{-4}$ ml./cm$^2$ cm. hr. atm. at room temperature for oxygen, selected from the following categories:
(a) RTV (room temperature vulcanizing) polysiloxane adhesive sealants utilizing an acetoxy cure system, and incorporating a filler and an acyloxy silane;
(b) RTV silicone rubber made with a tin-catalyzed condensation cure system, said silicone rubber comprising a silicone polymer, a cross-linking agent and a filler material;
(c) composite silicone base materials comprising dimethyl siloxane copolymers and styrene acrylic esters; and
(d) fluorocarbon elastomers,
said coating being adhesively secured to said substrate; and (3) means provided for escape of gases permeating the coating, from between said coating and the supporting substrate, said means for escape of gases serving to prevent a build up of gases between said coating and said substrate which would tend to dislodge the coating from the substrate, thereby to maintain the adhesion of said coating to said substrate;
the combination of said elastomeric coating (2) and gas escape means (3) rendering said substrate resistant to said corrosion.

In the drawings annexed hereto and illustrating, by way of example, particular embodiments of the invention.

Figure 1:
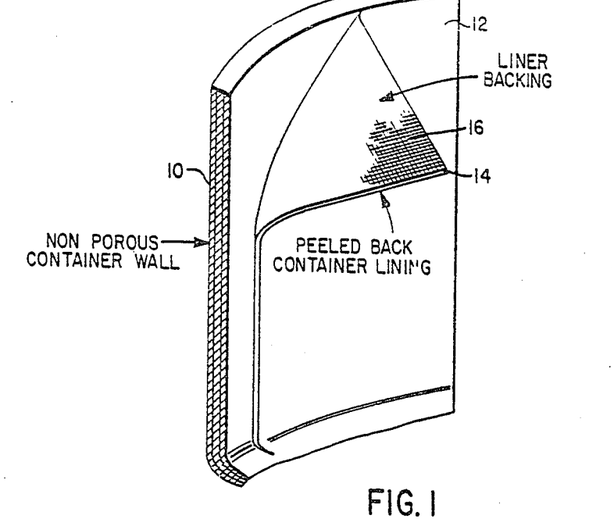
FIG. 1 is a schematic, elevational view of a portion of a container wall having a liner comprising a silicone rubber coating on a porous backing material in accordance with one aspect of the present invention.
Figures 2, 3:
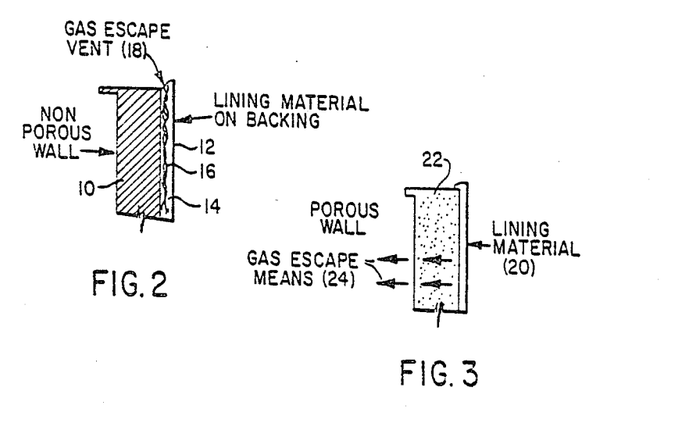
FIG. 2 is a fragmentary sectional view of the container wall having a liner as illustrated in FIG. 1, showing one form of gas escape vent.
FIG. 3 is a fragmentary sectional view of a porous wall having secured thereto a liner including a silicone rubber coating, in accordance with another aspect of the invention.

Referring now to FIGS. 1 and 2 of the drawings, there is shown a lining 12 for a non-porous substrate 10, depicted in FIG. 1 as a portion of the wall of a vessel or container for use in an electrolytic process. Lining 12 includes a silicone rubber coating 14 which is applied to a porous backing material, shown in FIG. 1 as woven glass cloth 16. A portion of this backing layer is shown peeled back from the substrate, for the sake of clarity. Lining 12 is adhesively affixed or secured to substrate 10 by the use of any suitable adhesive. At appropriate points between the lining material and the non-porous substrate 10, gas escape vents 18 are provided by the porous backing layer (see FIG. 2), so that gases present in the reaction medium to which the system is exposed (for example, electrolytic cell liquor containing hydrogen, oxygen and chlorine), which gases permeate the lining 12 and in the absence of escape vents 18 would tend to build up behind the lining and in time would dislodge the lining from substrate 10, may escape, thereby preventing such gas build-up. As a result, the adhesion of lining 12 to substrate 10 is maintained.

In FIG. 3 an alternative embodiment of the invention is illustrated. Here the lining material 20, which suitably is similar to lining 12 of FIGS. 1 and 2, is adhesively affixed or secured to a porous substrate 22, such as for example, porous brick, concrete or the like. The porous substrate is provided with, or contains, a plurality of orifices 24 or other appropriate vent means through which gases permeating through the lining are permitted to escape, thereby preventing the build-up of gases behind the lining 20.

In seeking improved materials for lining electrolytic cell tanks for the sodium chlorate process as well as for the construction of internal equipment for these containers, all of which are subject to temperatures up to 95° C. and pH ranges of 6 to 8, and with an active sodium hypochlorite concentration of 2–5 gpl, we coated polyester resin fiberglass reinforced plastic sheet coupons with various RTV silicone rubbers of the categories above-defined both with and without primers and with and without solvent cleaning of the substrates. We similarly coated steel and unplasticized PVC substrates. In addition we adhered woven glass cloth both of twisted glass fibres, and of roving yarn of an open weave, by use of polyester resin adhesive, to FRP (fiberglass reinforced polyester) resin coupons and applied the cloth to two sides and keyed into the said glass various silicone coatings. Our experimental procedure involved:

(1) preparing approximately 4" square substrate samples;

(2) adhering to certain of these substrate samples using a polyester resin brush coat an open weave electrical and chemical resistant glass cloth treated with a silicone compound;

(3) placing over the substrate a fine gauge electrical conductor wire so that the sample might be tested for electrical resistivity in the reaction solution;

(4) cleaning the nonglass coated samples of the FRP polyester resin, and the PVC and steel with a 5° xylol solution and letting this dry for 30 to 60 minutes.

(5) applying Canadian General Electric primers "SCP 3154" or "SS 4024" to certain of these samples: these primers contain silicones in solvent.

(6) coating using an extrusion nozzle these samples with 1/16" to 1/8" thickness of RTV silicone rubber of the following classes or trade designations:
1. "Canadian General Electric RTV 51-10", a trademark for a Class 1, low viscosity, self-leveling RTV silicone;
2. "Canadian General Electric RTV 108", a trademark for a Class 1, thixotropic, trowelable, RTV silicone;
3. "Canadian General Electric RTV 156", a trademark for a Class 1 silicone of high durometer and super-strength and containing a red pigment;
4. "Canadian General Electric RTV 162", a trademark for a Class 1 silicone, pigmented, medium durometer but of relatively uniform molecular weight to give high tear strength;
5. Canadian General Electric white bath tub seal and caulk, a Class 1 silicone containing a white pigment;
6. "Dow-Corning 732", a trademark for RTV silicone rubber of Class 1, of thixotropic consistency, and is trowelable;
7. "Dow-Corning 734", a trademark for a RTV silicone rubber of Class 1, formulated to be self-leveling; and
8. "Dow-Corning Silastic J", a trademark for a RTV silicone rubber moulding compound of Class 2, 2-component using a tin-catalyzed curing system.

(7) placing all these samples in a test electrolytic cell connected with the wires thereon connected to the anode bus so that an electrical potential across the membrane to the cell liquor was applied, and testing them in this cell for a period of 30 days.

Concurrently, separate adhesion tests were performed using "Canadian General Electric RTV 108" silicone on the substrates prepared under the variations above except for the glass cloth coated substrates and these were mechanically checked for adhesion after a 7-day cure and subsequently after a 48-hour hot water bath.

These samples were immersed in an operating sodium chlorate test cell at a temperature of 65° C. for various periods. The summary of these tests and the results thereof is shown in the following Example 1.

The following silicone rubber samples were trowelled directly onto samples approximately 4"×4" or trowelled into a glass woven material which was previously adhered to the FRP with polyester resin. Where indicated, a copper wire was built in against the FRP to be connected to the positive bus in the test cell. These samples endured various time periods in a Material Test Cell (M.T.C.). In this cell we approximated conditions in a commercial chlorate cell.

Example 1

| Sample | Application | Test Treatment | Test Results |
|---|---|---|---|
| G.E. white bath tub caulk | FRP coupon - silicone rubber into glass cloth, then a second layer built up. Wired. | 6 days in M.T.C. | rubber peels from glass cloth |
| G.E. clear silicone seal | FRP coupon - silicone rubber into glass cloth, then a second layer built up. Wired. | 2 days in M.T.C. | very difficult to peel layers apart |
| G.E. clear silicone seal | FRP coupon - rubber laid in continuous bead on FRP. Wired. | 6 days in M.T.C. | rubber pulls apart, does not peel |
| G.E. white bath tub caulk | FRP coupon - rubber laid in continuous bead on FRP. Wired. | 6 days in M.T.C. | rubber pulls apart, does not peel |
| "G.E. RTV 108" | FRP coupon - rubber laid in continuous bead on FRP. Wired. | 41 days in M.T.C. | rubber pulls apart, does not peel |
| "G.E. RTV 108" | FRP coupon - rubber laid in beads on FRP after G.E. surface conditioner SS 4124 was properly applied. | 1 day in M.T.C. | RTV peels easily from FRP |
| "G.E. RTV 162" | FRP coupon - RTV into glass cloth, then a second layer built up. Wired. | 12 days in M.T.C. | glass cloth and RTV bubbled away from FRP |
| "G.E. RTV 156" Superstrength | FRP coupon - RTV into glass cloth, then a second layer built up. Wired. | 41 days in M.T.C. | glass cloth and RTV bubbled away from FRP |
| "G.E. RTV 156" Superstrength | FRP coupon - RTV trowelled onto FRP. Wired. | 12 days in M.T.C. | bubbled between RTV and FRP |
| "G.E. RTV 162" | FRP coupon - RTV trowelled onto FRP. Wired. | 41 days in M.T.C. | bubbled between RTV and FRP |
| "Dow Corning 734" RTV self-levelling | FRP coupon - RTV into glass cloth, then a second layer poured on. Wired. | 2 days in M.T.C. | peels from FRP with glass cloth moderate effort |
| "Dow Corning | FRP coupon - RTV into | 6 days in | peels from FRP |

-continued

Example 1

| Sample | Application | Test Treatment | Test Results |
|---|---|---|---|
| J-RTV" Two Part | glass cloth, second layer poured on. Wired. Oven cured. | M.T.C. | with glass cloth or peels from glass cloth with moderate effort |
| "G.E. RTV 108" | FRP coupon - glass cloth anchor saturated with polyester resin when bonded to FRP. RTV trowelled on. Edges trimmed. | 9 days in M.T.C. | bubbles under RTV at edge of sample |
| "G.E. RTV 108" | FRP coupon - RTV trowelled into glass cloth anchor, and the next day a second coat applied. Different amounts of saturation of glass cloth allowed when adhering it to FRP. Edges trimmed. | 52 days in M.T.C. | adhesion still good - peels RTV silicone coating or RTV silicone coating and anchor cloth with considerable effort. There is seepage of the liquor into the layer interfaces from pinholes at the edge of the sample |
| "G.E. RTV 108" | FRP coupon - glass cloth adhered to FRP with strips of polyester resin saturating cloth. RTV trowelled into glass cloth and second coat applied next day. Edges trimmed. | 9 days in M.T.C. 52 days in M.T.C. | bubbles form under strips of glass cloth not adhered to sub- strate RTV silicone coating peels from FRP with glass cloth with moderate effort |

RTV = RTV (room temperature vulcanizing) silicone rubber coating
FRP = fiberglass reinforced polyester From Example 1 it can be observed that the RTV silicone rubbers withstood the chemical corrosion and electrical potential conditions of the test cell and that the coatings lost their adhesion by gas bubbling between the coatings and the substrate in the test samples in which no means of gas escape was provided. In this example the means of gas escape, either of entrapped air or gas permeating through the coating, was inadver- tently provided in some test coupons by electrical con- duction wires, unsealed edges, use of narrow beads, or woven glass cloth backing adhered to the substrate. On the last three items of the test schedule the edges of the samples were trimmed and a gas escape thereby pro- vided.

We then coated larger FRP coupons for immersion in commercial sodium chlorate cells. The results of these tests are shown below as Example 2.

EXAMPLE 2

| Sample | Application | Test Treatment | Test Results |
|---|---|---|---|
| "G.E. RTV 108" large sample (4" × 5" × ⅛") | Trowelled into glass cloth anchor on FRP, then a second coat built up. Wired. | 10 days in com- mercial NaClO₃ cell | glass cloth and RTV silicone coating lifting from FRP in randomly situa- ted bubbles |
| "G.E. RTV 108" large sample (4" × 5" × ⅛") | Trowelled onto FRP. Wired. | 10 days in com- mercial NaClO₃ cell | RTV silicone coating lifting from FRP |

We then coated three polyester resin FRP structures in the form of hydrogen containing boxes for commer- cial chlorate cells for use in the cells immersed in the liquor electrolyte, in the hydrogen, oxygen, chlorine gas saturated liquor flowing up out of the electrolytic cell boxes. The results of these tests are shown in Exam- ple 3 below.

Example 3

| Sample | Application | Test Treatment | Test Results |
|---|---|---|---|
| "G.E. RTV 108" on hydrogen box structure #2 of BASF hand lay up resin (an isophthalic polyester | Trowelled into glass cloth anchor on FRP, then a second coat built up next day. | 150 days in com- mercial NaClO₃ cell at Marathon (cell #2) exterior surface | cohesion looks good on interior and most of ext- erior surfaces. Some bubbling observed on one earlier - trouble free operating |

-continued

Example 3

| Sample | Application | Test Treatment | Test Results |
|---|---|---|---|
| "G.E. RTV 108" on hydrogen box structures (#1 and #3) of "Hetron 197" "Derakane 510"** resins | Trowelled onto FRP, and inspected and touched up later | 75 days in commercial NaClO₃ cell at Marathon temperatures approaching 80° C. (#3) | after 150 days #3 cohesion poor outside, many bubbles, some containing cell liquor. Inside the RTV has peeled from the FRP over perhaps ½ the area. It hangs on the stacks like a torn bag. #1 collapsed within 100 days |

*"Hetron 197" is a trademark for a polyester resin formed by the reaction of the (1) the product formed by hydrolysis of the condensation product of maleic anhydride with hexachloro cyclopentadiene with (2) glycols and maleic anhydride, which is then in turn cross-linked with styrene. It contains about 30% chlorine.
**"Derakane 510" is a trademark for a vinyl ester resin.

Example 3 confirms the superiority of adhesion and integrity of the RTV silicone rubber applied to a loose-woven glass backing adhered to the FRP structure compared to the RTV silicone rubber applied, after xylol cleaning, directly to the FRP structures.

The above examples all suggested that where a gas release space was provided adjacent to the surface of the RTV rubber unexposed to the corrosive liquor, the adhesion was markedly superior to the examples in which the RTV silicone rubber was applied to an integral substrate without any gas release space behind it.

To confirm this judgement the experiment in Example 4 was conducted.

EXAMPLE 4

A test sodium chlorate cell of size 24" long×4" wide×8" deep was made of FRP (fiberglass reinforced polyester) resin. The inner surface was cleaned with 5° xylol and a coating of RTV silicone rubber was applied after the FRP had been cured for two days at 120° F. The silicone rubber selected was Canadian General Electric's "RTV 108" and it was trowelled on by hand and using ice as a trowel. The RTV rubber coating was then allowed to cure for 30 days.

The test cell was then started up and operated at a temperature of 90°-95° C. after which it was drained and examined. The RTV silicone rubber lining showed two wide patches on each wall where there was no adhesion but without bulging out. The cell was restarted in the same liquor; after a further two days at 90° C. the RTV rubber was not adhering in many places and large bubbles had been created on each of the four walls, particularly towards the upper area covered by the cell liquor. The bottom lining was also not adhering for most of its surface but it did not bulge upwards. The RTV silicone rubber lining appeared to be integral against leakage of liquor. Two slots were opened to release the gas which had no particular smell and then resealed and the cell restarted. After 20 hours at 85°-90° C. the two walls were again bulging out with approximately 1 liter of gas on each side.

A sample of the gas was taken and analyzed on the gas chromatograph. It was shown to be consistently 60-80% oxygen with traces of nitrogen and hydrogen.

Holes and gas release tubes were fitted through the walls of the substrate on either side of the test cell and on the bottom of the test cell and one end wall stripped of the original "RTV 108" silicone rubber coating and recoated with a patch consisting of a woven glass onto which was applied RTV rubber and the glass was adhered to the side of the tank wall with a polyester resin without saturating the glass and with the top edge of the glass left exposed to the atmosphere. The cell was then again started up and operated at 78°-90° C., and after three weeks of such operation there was no sign of bulging out or lack of adhesion on this end wall or the sides or bottom as a result of gas permeation.

From Example 4 we have confirmed that a requirement for an RTV silicone rubber coating to be used in the environment which we are studying for corrosion resistance purposes is that there should be a means for escape of the gases which permeate through the RTV silicone rubber membrane and that if such means of escape is provided, the coating will continue to adhere and perform satisfactorily.

It is well known that RTV silicone rubber membranes are selectively permeable to oxygen and other common gases, and we have discovered a means of utilizing them as corrosion resistant linings to contain liquid in which gases are evolved or entrained and gases in which corrosive liquids are entrained, by incorporating them in a composition of materials onto and including substrates which provide a release path to the atmosphere for the gases which do permeate them.

RTV silicone rubber corrosion and weight losses were checked in accordance with the following example.

EXAMPLE 5

The surface of RTV silicone rubber 108 applied to an FRP substrate coupon immersed in a commerical chlorate cell for three months and of which its coating has separated from the FRP, was checked and was shown to have suffered no loss of strength or resilience. Microscopic examination at 10×40 revealed a pitting or crazing of the surface of the RTV rubber to a depth of 0.010 mm in three months or the equivalent of 0.0016 inch per year.

Samples of RTV 108 of known dimensions were immersed in a normal sodium chlorate test cell at a temperature of 65° C. for one month and these showed an average weight loss of 0.0056 gram per sq. in. and after a further month a weight loss of 0.0009 gram per sq. in. A similar-sized sample of low viscosity Canadian General Electric's "RTV 51-10" under similar tests was 0.007 gram in the first month and 0.00075 gram per sq. in. in the second month.

Similar test coupons of RTV silicone rubber were immersed in sodium chlorate test cells run intentionally at a high pH of 9, and the weight losses were similar.

The above results extrapolate to an exposed surface corrosion rate of between 0.0016 and 0.004 inches per year.

Additional tests were made of coating RTV silicone rubber onto various substrates, devising means which provided for the escape of gases which permeated through it. These are shown in Example 6 below.

EXAMPLE 6

A sample of ¼" thick PVC unplasticized sheet approximately 3"×10" in size was coated with RTV silicone rubber "CGE 108" applied to a porous glass backing to which it was keyed and the glass backing adhered to the PVC by dissolving the surface of the PVC sheet with methyl ethyl ketone and then applying the glass backing which then adhered upon resetting of the dissolved PVC. This sample was prepared with the glass backing coming up to the top of the test coupon being exposed and the sample was tested in the sodium chlorate test cell with the top of the test coupon open to the atmosphere. After two weeks of such exposure the RTV silicone rubber coating was integral and unbubbled from the substrate.

EXAMPLE 7

We have also tested RTV silicone rubber coatings in boiling brine; and applied them to a cleaned and primed PVC substrate in a low gas-containing sodium chlorate, sodium chloride, sodium hypochlorite tank after cleaning the surface with xylol and priming it with a primer made of xylenes in solvent. Additionally, we applied these coatings directly without gas vent backing to steel substrates exposed to salt- and dust-laden air at high velocity. As an example, we applied a thin "CGE RTV 108" silicone coating to xylol-cleaned steel, and subjected the coupons to high speed dirty gas flow conditions by attaching them to the rim of an automobile wheel for 2,000 miles of Canadian winter driving. In all cases, the coatings showed integrity and lack of corrosion by the atmosphere or environment, and continuous adhesion, for extended periods.

Our observations of these test items after three months of service for the immersion materials and after the dirty air stream test for the coated steel sample were as follows:

(1) For this service the "CGE 108" and "CGE 51-10", (which differ only in molecular weight and viscosity, with the "51-10" more suitable for airless spray application) adhere to PVC substrates both with and without a silane primer, but the silane primer does improve adhesion.

(2) The RTV ("CGE RTV 108") silicone coating on steel subject to 60 to 80 feet-per-second of air and entrained road salt and grit velocity impingement withstands the conditions without surface impairment, cracking or loss of adhesion.

(3) The adherence of the silicones of both the class of "CGE 108" and of the Dow-Corning pigmented one-component cure silicones is good when applied to the open-woven glass covering.

(4) The adherence of the silicones "CGE 108" and "CGE 51-10" when applied to dust free xylol- or toluene-cleaned FRP polyester or vinyl ester resin substrates is excellent.

(5) All the silicones tested retained their dielectric strength and liquid integrity after three months in service in their elasticity.

(6) Good adherence of over patches was achieved on the above samples using "CGE 108" and "Dow-Corning 734" after coupons had been on thirty days' service.

EXAMPLE 8

We further applied an RTV silicone rubber onto a venting glass backing and then to an anodically connected submerged copper bus lead in to the cell liquor to a sodium chlorate cell to protect the buswork from corrosion, and this has shown integrity and protection for a period of three months, except for liquor intrusion in minor pinholes arising from defective application. Other experimental work was done as per Table III. The chlorate cell tests of this Table were done by immersing samples of the materials in a chlorate electrolyte cell as described also in preceding Example 5.

The chlorine cell Tests of Table III were done by immersion in NaCl solution saturated by bubbling $Cl_2$ gas at low pH values and high temperatures (180°–210° F.). The solution reproduces the conditions encountered in electrolytic cells that produce chlorine.

Table III shows that also heat curing silicones and fluorosilicones are materials of excellent chemical resistance. This table shows also that fluorosilicones can be used in the liquors of $Cl_2$ producing electrolytic cells.

It is therefore obvious that the field of applicability of the silicone and fluorosilicone elastomers is quite wide and also that Room Temperature Curing (RTV) and high temperature curing silicones and fluorosilicones have similar outstanding properties.

Their actual use as lining materials is made difficult by their high permeability to gases as shown in Table 1 and consequent bubbling off the substrates they are supposed to protect.

The present invention offers a new practical way to use the silicones as liners according to the description given above.

The results of our experimental test work were unexpected in terms of the ability of the RTV silicone rubber materials to adhere to substrates in thin films for corrosion protection service, and to be adhered to substrates for corrosion protective services where gaseous entrained products are involved, as long as porosity and/or a means to escape to atmosphere of such gases as permeate, is provided back of the coatings. Our test work and experimentation also confirmed that silicone rubbers applied in accordance with our experimentation meet the requirements for lining materials as set out earlier in this specification.

The following illustrates the economics involved in using silicone liners;

The cost of RTV silicone rubbers range from $2.50 to $5.00 per pound, and these rubbers, on the average, have a density of about 0.04 lb. per cu. in. The silicone rubber for a coating 1/16" to ⅛" thick on average therefore costs between $1.40 and $3.50 per sq. ft. and the cost of the porous cloth backing and fabrication of this to the coating material if required in application, costs on the order of $1.00 per sq. ft., so that complete coatings can be achieved in the cost range of $2.50 to $5.00 per sq. ft. With woven roving glass cloth coatings of 1/16" thick are expected to have a service life in the environments described of up to 20 years. These can be produced and applied at lower costs. These are savings of significant economic merit, when one compares these costs to the costs entailed using the groups of fluorocarbon polymers at the costs quoted earlier in this specification.

Although the RTV silicone rubber coatings applied in our test work were done by hand or pressure nozzle either directly onto the substrate or into the woven glass cloth backing and then the backing adhered by FRP polyester resins or other resins to the substrate, such coatings may be applied by airless spraying, painting or in evaporative solvents or with trowelling or continuous machine coating.

TABLE III

| Material | Chlorate Cell Tests | Chlorine Cell Tests |
|---|---|---|
| AR 321* Fluorosilicone 70% Methylsilicone 30% mixture | 1.7 mils/year thickness loss | 25 mils/year thickness loss |
| AR 815* "Viton" Fluoroelastomer (Heat Curing) | small weight gain | small weight gain |
| AR 328 C* Fluorosilicone (Heat Curing) | not determined | 2.5 mils/year |
| 028C G.E. Fluorosilicone (Heat Curing) | 2.1 mils/year thickness loss | 0.25 mils/year thickness loss |

*ARMET Industries Box 100 Spruce Street Tillsonburg, Ontario, Canada

Further, where a porous glass backing is used the backing may be adhered to the substrate by any adhesive means. The adhesive to be used is not limited to polyester resins, but must, of course, be compatible with the substrate. The choice of adhesive material may be left to the discretion of those skilled in the art. For example, an appropriate choice of adhesive material may be made from those adhesives described in the *Handbook of Adhesives*, Irving Skeist, Editor (Reinhold Publishing Corp.) 1962. For a further discussion of adhesives from which a suitable selection may be made, reference is made to the *Handbook of Plastics and Elastomers*, Charles A. Harper, Editor-in-Chief (1975), McGraw-Hill Book Co., and in particular Chapter 10 thereof, entitled "Plastics and Elastomers as Adhesives"—Edward M. Petrie. For example, epoxy resins or contact cements may be used equally effectively as polyester resins provided the gas venting system is designed to prevent the ingress to the interface of the porous layer and the substrate of any of the corrosive chemicals.

The thickness of RTV silicone rubber coating applied may be varied considerably. Generally speaking, the coating thickness may range from about 0.002" to about 0.5", but preferably its thickness will be in the range of 1/16" to ¼".

The present invention has been described hereinabove in some detail with respect to certain embodiments. Those skilled in the art concerned will recognize that numerous variations are possible and may be made, as for example, in the type of plastic or coating material and/or the type of backing material which may be used, and/or the nature of the substrate to which the lining material is applied. It is to be understood, then, that this invention is not to be limited to what is specifically described in, for instance the Examples, but is to be limited only by the following claims.

We claim:

1. A corrosion-protective system comprising:
   (1) a substrate which is susceptible to corrosion by action of a corrosive chemical-containing and gas-containing medium,
   (2) an elastomeric coating which is resistant to the action of corrosive chemicals in said medium and which renders said substrate resistant to said corrosion, and of known gas permeability, the elastomer having a suitable viscosity in the uncured state to enable said elastomer to penetrate into a porous backing in a controlled manner,
   (3) gas escape means provided for escape of gases permeating the coating, from between said coating and the supporting substrate, said means for escape of gases including a porous backing material upon which said elastomeric coating is coated, the coating serving to protect the substrate from the action of said corrosive chemicals in said medium, said backing material being adhesively secured to said substrate and serving to prevent a build up of gases between said coating and said substrate which would tend to dislodge the coating from the substrate, thereby to maintain the adhesion of said coating to said substrate; and said gas escape means rendering said coating resistant to disadherence or delamination; the combination of said elastomeric coating and gas escape means rendering said substrate resistant to said corrosion in spite of gases contained in said corrosive medium.

2. A corrosion-protective system comprising:
   (1) a substrate which is susceptible to corrosion by the action of a corrosive chemical-containing and gas-generating medium,
   (2) an elastomeric coating which is resistant to the action of corrosive chemicals in said medium and which renders said substrate resistant to said corrosion, and of known permeability of at least $10^{-4}$ ml./cm$^2$ cm. hr. atm. at room temperature for oxygen, and an elastomer viscosity (uncured) of 100–2000 poise, (3) gas escape means provided for escape of gases permeating the coating, from between said coating and the supporting substrate, said means for escape of gases including a porous backing material upon which said elastomeric coating is coated, the coating serving to protect the substrate from the action of said corrosive chemicals in said medium, said backing material being adhesively secured to said substrate and serving to prevent a build up of gases between said coating and said substrate which would tend to dislodge the coating from the substrate, thereby to maintain the adhesion of said coating to said substrate; and said gas escape means rendering said coating resistant to disadherence or delamination; the combination of said elastomer coating (2) and gas escape means (3) rendering said substrate resistant to said corrosion in spite of gases contained in said corrosive medium, said elastomeric coating being applied to said porous backing material in a controlled way that the backing material is held mechanically by the coating and yet its porous body is substantially free from coating material so that 70 to 97% of the pores of the backing material remain open, to thereby form a laminate which is then adhered to said substrate by adhesive bonding means, said adhesive bonding means having a viscosity in the range of 1 to 200 poise and filling the remaining open pores of said porous backing material which are not filled with said elastomeric coating so that, after the elastomeric coating has been applied, 10 to 50% of the open pores of said porous backing material of said laminate remain open to the atmosphere.

3. The corrosion protective system as defined in claim 2 wherein said elastomeric coating is selected from the group consisting of:
(a) RTV (room temperature vulcanizing) polysiloxane adhesive sealants utilizing an acetoxy cure system, and incorporating a filler and an acyloxy silane;
(b) RTV silicone rubber made with a tin-catalyzed condensation cure system, said silicone rubber comprising a silicone polymer, a cross-linking agent and a filler material; and
(c) fluorocarbon elastomers.

4. The system of claim 2 wherein the porous backing material is woven glass cloth.

5. A system according to claim 2 wherein the substrate is perforated, the perforations permitting escape of gases from beneath the elastomeric coating.

6. A system according to claim 2 wherein the elastomeric coating is an RTV silicone rubber of category (a).

7. A system according to claim 2 wherein the elastomeric coating is an RTV silicone rubber of category (b).

8. A system according to claim 2 wherein the elastomeric coating is a fluorocarbon of category (c).

9. A system according to claim 2 wherein the substrate comprises walls of vessels or surfaces of equipment, valves, fittings, piping and the like, for use in producing and handling corrosive chemicals or food products in liquid, mixed phase or gaseous form, or by-products thereof.

10. A system according to claim 9 wherein the substrate comprises apparatus for carrying out the electrolysis of alkali metal halides.

11. A system according to claim 9 wherein the substrate comprises apparatus for the electrolysis of sodium chloride, for the production of sodium chlorate, and for the handling of electrolysis products of sodium chloride.

12. A system according to claim 9 wherein the substrate is one or more of the following: linings for gas and vapor ducting, piping and exhausters, and fans and vessels in which corrosive liquors are entrained in gases.

13. A system according to claim 9 wherein the substrate is electrically conducting buswork.

14. In a vessel for electrolysis of sodium chloride for the production of sodium chlorate, the improvement which comprises all exposed surfaces of the vessel being coated with an elastomeric coating which is resistant to the action of corrosive chemicals in said medium and which renders said substrate resistant to said corrosion, and of known permeability of at leat $10^{-4}$ ml./cm$^2$ cm. hr. atm. at room temperature for oxygen, said coating being adhesively secured to the surface of the vessel; and gas escape means provided for escape of gases permeating the coating of the elastomer from between the coating and the surface of the vessel, said means for escape of gases including a porous backing material upon which said elastomeric coating is coated in a controlled manner, the coating serving to protect the substrate from the action of said corrosive chemicals in said medium, and said gas escape means rendering said coating resistant to disadherence or delamination; and serving to prevent a build up of gases between the coating and the vessel surface which would tend to dislodge the elastomeric coating from the surface of the vessel and thereby to maintain the adhesion of the coating to the surface of the vessel.

15. In the vessel as defined in claim 14, wherein said elastomeric coating is selected from the following categories:
(a) RTV (room temperature vulcanizing) polysiloxane adhesive sealants utilizing an acetoxy cure system, and incorporating a filler and an acyloxy silane;
(b) RTV silicone rubber made with a tin-catalyzed condensation cure system, said silicone rubber comprising a silicone polymer, a cross-linking agent and a filler material; and
(c) fluorocarbon elastomers.

* * * * *

UNITED STATES PATENT OFFICE
CERTIFICATE OF CORRECTION

Patent No. 4,299,869     Dated November 10, 1981

Inventor(s)     HAROLD VINCENT CASSON ET AL

It is certified that error appears in the above-identified patent and that said Letters Patent are hereby corrected as shown below:

In the Disclosure:

Col. 3, line 46, change "$cm^1$" to -- $cm^2$ --.

Col. 5, lines 60, change "s" to -- a --.

Col. 8, line 61, change "$ml./cm^2.hr.atm.$" to -- $ml/cm^2\ hr\ atm$ --.

Col. 12, in Example 1, in line 39 thereof under the heading "Test Results", before "moderate" insert -- with --.

Col. 14, in Example 3, in line 7 thereof under the heading "Test Treatment", "exterior surface" has been misplaced and should be under the heading "Test Results".

Col. 15, in Example 3, in line 1 of the footnotes, after "(1)" delete "the".

UNITED STATES PATENT OFFICE
CERTIFICATE OF CORRECTION

Patent No. 4,299,869          Dated   November 10, 1981

Inventor(s)   HAROLD VINCENT CASSON ET AL

It is certified that error appears in the above-identified patent and that said Letters Patent are hereby corrected as shown below:

Col. 18, lines 20-22, please amend to read as follows:
"(5) All the silicones tested retained their dielectric strength, liquid integrity, and elasticity after three months in service."

Col. 22, line 30, change "leat" to -- least --.

Signed and Sealed this

Eleventh Day of May 1982

[SEAL]

Attest:

Attesting Officer

GERALD J. MOSSINGHOFF

Commissioner of Patents and Trademarks